No. 839,468. 
PATENTED DEC. 25, 1906.
G. H. GILLETTE.
FLEXIBLE SHAFT.
APPLICATION FILED MAY 4, 1906.
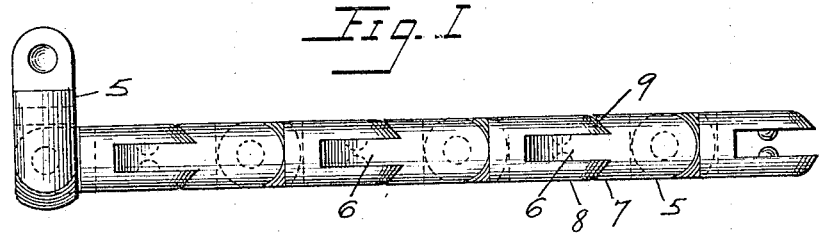
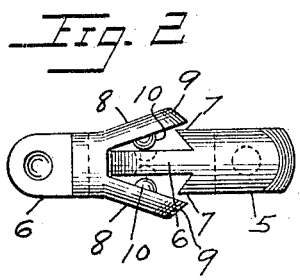
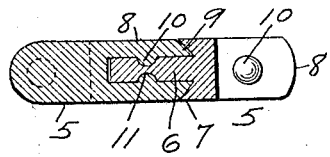
Witnesses
C. H. Berthold
Harold Leth
Inventor
George H. Gillette
By his Attorney
Garry P. Van Wye

UNITED STATES PATENT OFFICE.

GEORGE H. GILLETTE, OF NEW YORK, N. Y.

FLEXIBLE SHAFT.

No. 839,468.

Specification of Letters Patent.

Patented Dec. 25, 1906.

Application filed May 4, 1906. Serial No. 315,226.

*To all whom it may concern:*

Be it known that I, GEORGE H. GILLETTE, a citizen of the United States, residing at New York, in the county and State of New York, have invented a new and useful Flexible Shaft, of which the following is a specification.

This invention relates to flexible shafts used in driving mechanism which is constantly being shifted; and the object thereof is to provide a shaft of this character that will not kink or get twisted and at the same time provide for great flexibility.

The invention is illustrated in the accompanying drawings, in which—

Figure 1 is a side view of a portion of flexible shaft constructed according to my invention. Fig. 2 is a view of two of the links before being clamped together, and Fig. 3 is a sectional view through two links after being assembled.

In the accompanying drawings like numerals of reference refer to the same parts in each of the views, and in practice I provide a flexible shaft comprising a plurality of separate links 5, the body of each of which is preferably cylindrical in form, and when cast one end of the link is provided with a projecting tenon 6, which is preferably flat on the sides, and the end of the cylindrical portion adjacent to the tenon is preferably cut out to form a depression, so as to leave projecting portions 7, and the opposite end of the link is divided to form a yoke or mortise with flaring sides 8, the ends of which are beveled, as shown at 9, the beveled ends being adapted to fit within the depressions behind the projections 7.

On the interior of each of the sides 8 is formed an integral boss 10, and the tenon 6 is provided in each side thereof with a recess 11, proportioned in size to receive the bosses 10.

In assembling the links together the link being secured in place is turned at right angles, as shown at the left in Fig. 1. The two sides 8 are then pressed inward until the bosses 10 engage the recesses 11, when the outer surface of these sides will be in line with the body of the link. Then by swinging the link around on this pivotal connection until the link is in line with the rest of the shaft the beveled ends 9 will be housed beneath the projections 7, and the projections 7 will prevent the spreading of the sides 9, so that there will be no danger of the links becoming separated when in use.

In the drawings I have shown the links with the tenons at right angles with the yoke, so that in use the shaft could be readily bent in two directions. It is evident, however, that the tenon could be placed at any angle to the yoke and that the shaft could be built up with links each of which would have the tenon at a different angle through a series of links, so that there would be a wide variation in the lateral movement of the shaft. In practice, however, I find this is not necessary, as the two movements will provide all the flexibility desired in the ordinary flexible shaft.

In making the shaft it is understood that the material must be metal that will bend, such as soft brass or malleable iron, so the sides 8 can be bent into position after the link is cast. It will also be understood by those skilled in the art that when in use the shaft will be inclosed in the usual casing.

By the construction here shown a flexible shaft is provided that will not kink or get twisted, and owing to the shape of the links the shaft will have substantially all the advantages in solidity of an unbroken shaft, while at the same time being readily flexible.

It will be understood that many changes in the details of construction can be provided without departing from the spirit of my invention, such as providing pins through the parts 6 and 8 instead of the bosses and sockets or the recessing of both the parts 6 and 8 and using balls instead of the bosses or the omission of the beveled ends 9 and the projections 7, and I reserve the right to make any changes which come within the scope of my invention.

Having thus described my invention, what I claim as new, and desire to secure by Letters Patent, is—

1. A flexible shaft comprising a plurality of links hinged together in a mortise-and-tenon connection, one of the members forming the hinged connection being provided with bosses, and the other member being provided with recesses adapted to receive said bosses, for the purpose set forth.

2. A link for a flexible shaft having a tenon at one end with recesses in the sides thereof, the opposite end being bifurcated with flaring sides each of which is provided with a boss adapted to engage the recesses in the tenon of the next link.

3. A link for a flexible shaft having a tenon at one end with recesses in the sides thereof, the opposite end being bifurcated with flaring sides each of which is provided with a boss adapted to engage a recess in the tenon of the next link, the tenon and bifurcation of each link being at different angles.

4. A link for a flexible shaft having a tenon at one end with recesses in the sides thereof, the opposite end being bifurcated with flaring sides each of which is provided with a boss adapted to engage a recess in the tenon of the next link, the tenon and bifurcation of each link being at right angles.

5. A link for a flexible shaft having a tenon at one end with recesses in the sides thereof, the opposite end being bifurcated with flaring sides each of which is provided with a boss adapted to be depressed into a recess in the tenon of the next link, the ends of the bifurcated parts being beveled, and the end of the link adjacent to the tenon being cut out to form a depression thereby providing a housing for said beveled ends, as and for the purpose set forth.

6. A flexible shaft composed of a plurality of links each of which is provided with a tenon at one end and a recess on each side of said tenon, and a depression in the end of the link adjacent to the tenon, the opposite end of the link being bifurcated each side having a boss depressed into the adjacent recess of the tenon of the next link by forcing the sides inward against said tenon, the ends of the bifurcated parts being housed within the depressions at the base of the tenon when in use, as and for the purpose set forth.

In testimony whereof I have signed my name to this specification in the presence of two subscribing witnesses.

GEORGE H. GILLETTE.

Witnesses:
  HAROLD LETH,
  CHAS. H. WHITE.